United States Patent Office 3,761,231
Patented Sept. 25, 1973

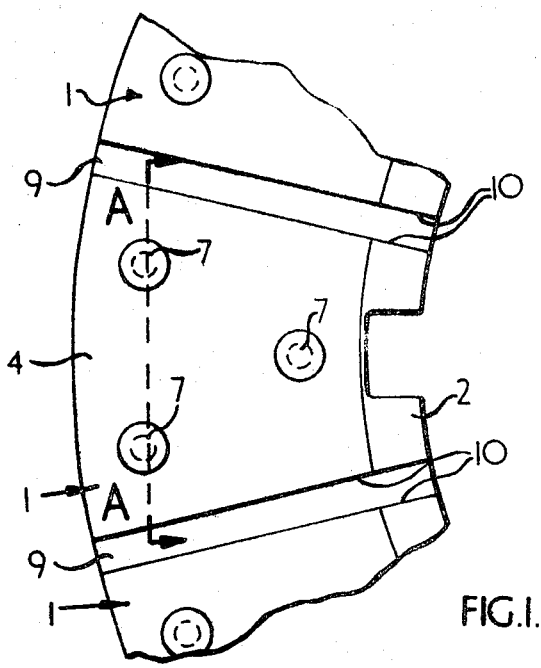
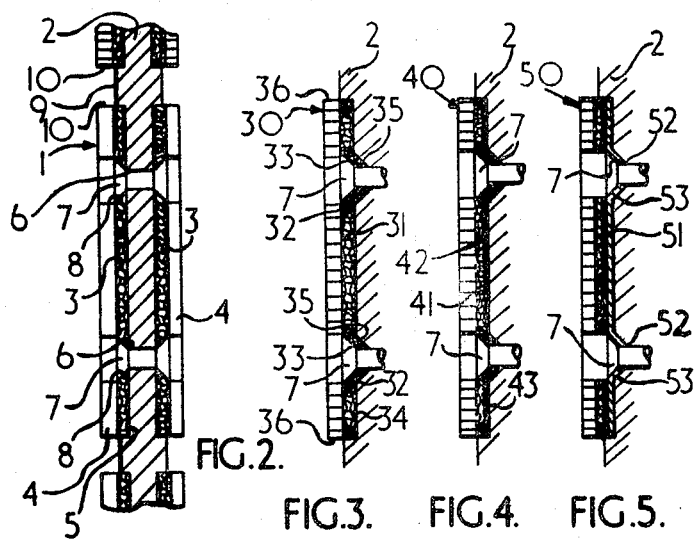
FIG.1. FIG.2. FIG.3. FIG.4. FIG.5.

3,761,231
COMPOSITE ARTICLES
Frederick Sidney Dowell, Coventry, and Ronald Fisher, Rugby, England, assignors to The Dunlop Company Limited, London, England
Filed Dec. 31, 1970, Ser. No. 103,179
Claims priority, application Great Britain, Jan. 10, 1970, 1,310/70
Int. Cl. B23p 3/00
U.S. Cl. 29—195 C  12 Claims

ABSTRACT OF THE DISCLOSURE

A composite article for use, for example, as a functional block comprising a block of non-metallic material having embedded therein a layer of porous material in the form of a three-dimensional network arranged so as to define a plurality of intercommunicating cellular spaces, the said layer extending adjacent one surface of the block but not wholly therethrough.

---

This invention relates to composite articles, and particularly, but not exclusively, to friction elements for aircraft brakes.

In a number of engineering applications it is necessary to secure a non-metallic article to a supporting member to form a composite article, and in certain applications where mechanical forces tending to break up the composite articles are large and where, for example, the non-metallic article may be relatively weak structurally it is difficult to provide satisfactory means for securing the articles together. One example of an application in which this difficulty has been found to arise is the attachment of carbon or graphite friction elements to rotor and stator plates in an aircraft wheel brake.

One object of the invention is to provide a carbon friction element having means by which it can be satisfactorily secured to a supporting member such as a brake rotor or stator.

According to oine aspect of the invention, a composite article comprises a block of non-metallic material having embedded therein a layer of porous material in the form of a three-dimensional network arranged so as to define a plurality of inter-communicating cellular spaces, the said layer extending adjacent one surface of the block but not wholly therethrough.

The porous material may be metallic, in the form of a sheet produced by spraying, dipping or electro-deposition of a metal on a polyurethane foam material. After deposition of the metal the polyurethane foam is removed by heating to "ash-out" the polyurethane. The polyurethane foam used is of the reticulated form, i.e. a foam in which the organic phase is a three-dimensional network with no substantial wall portions defining the cells.

Alternatively, the porous material may be non-metallic, e.g. ceramic, or may be in the form of a three-dimensional fine gauge wire mesh or felt, or perforated sheet arranged in the form of a three-dimensional network, such as "expanded metal" sheet.

Five embodiments of the invention will now be described by way of example with reference to the accompanying drawings in which:

FIG. 1 is a view of a part of a brake assembly as seen in a direction parallel to the axis of rotation of the brake assembly;

FIG. 2 is a sectional view on the line A—A of FIG. 1 of a pair of friction elements of the brake assembly;

FIG. 3 is a similar view to that of FIG. 2 showing a modified form of one friction element of the brake assembly;

FIG. 4 is a similar view to that of FIG. 3 showing another modified form of friction element;

FIG. 5 is a further similar view to that of FIG. 3 showing yet another modified form of friction element;

Figure 6:
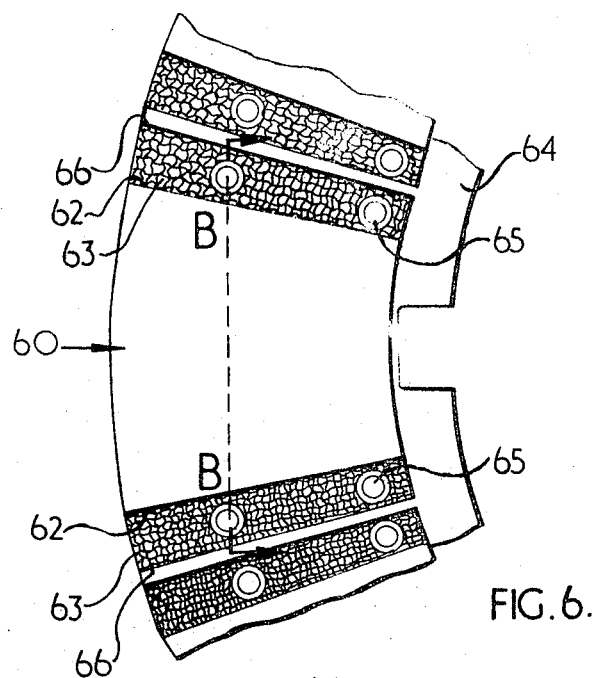
FIG. 6 is a similar view to that of FIG. 1 showing a brake assembly which comprises yet another form of friction element.

In a first embodiment, illustrated in FIG. 1 and FIG. 2, a friction element 1 for an aircraft brake rotor or stator is formed from carbon, and is a segmental shaped block which is designed to be assembled with a series of similar blocks around the annular surface of a brake member 2 which acts as a support for the friction elements 1.

The brake member itself may be of carbon or it may be of metal, such as steel or beryllium or of a composite material such as, for example, graphite reinforced with carbon fiber.

Each friction element 1 comprises a layer 3 of porous metallic material of the kind defined above embedded in a carbon block 4 adjacent the surface 5 of the block which is to be attached to the support member 2. The composite article constituted by the friction element 1 is formed by impregnating the porous metallic layer 3 with a suitable resin bonded composition, including powdered carbon or graphite, which is subsequently carbonized to form a block 4 in which the porous metallic layer is embedded but does not extend wholly therethrough. The friction pad material may incorporate any required friction and wear modifiers such as silicon nitride and alumina.

For high friction and wear properties it may be required to use graphite instead of carbon as the working part of the friction pad. Where the material of the porous metallic layer is not capable of withstanding the relatively high graphitization temperature the part of the pad containing the porous metallic layer may be made separately and raised only to carbonizing temperature. The part of the pad above the porous metallic layer is made separately as a graphite moulding and the two parts are then bonded together.

The porous metal layer 3 may be of any suitable metal having the required strength for force transmission at the working temperatures of an aircraft brake; possible metals for this purpose would include nickel, steel, copper, and molybdenum.

The friction element 1 is pressed to the required shape before carbonization, and in the pressing operation clearance holes 6 are formed in the element to enable, in the subsequent operation of securing the friction element to the support member 2, rivets 7 to be passed through the carbon block 4 and to engage the porous metallic layer 3 of the composite article. In a typical example, three such holes 6 may be provided. The friction element 1 may thus be secured to a rotor or stator member, or to a metal backing plate suitably shaped for mounting on a rotor or stator member, by means of rivets 7 passing through the clearance holes 6 formed in the carbon block 4 and having, for example, conical heads 8 for engagement with the porous metallic layer 3. Frictional forces generated on the element 1 during operation of the brake are transmitted to the support member 2 by raised radial ribs 9 formed on the support member 2 and engaging the radial edges 10 of the friction elements.

The arrangement described above has the advantage that the relatively weak carbon material 4 of the friction pad 1 is reinforced in its region of attachment to the support member 2 by the porous metallic layer 3 which is keyed mechanically into the carbon block 4 and which forms a firm connection therewith so as to secure the carbon block to the rivets 7 by which the composite friction element 1 is secured to the support member.

A further advantage of the use of a porous metallic layer 3 for bonding a friction pad to its support is that unlike certain other bonding layers it does not constitute a layer of low thermal conductivity, but on the contrary provides good heat transfer properties which improve the flow of heat, generated during a braking operation from the friction pad material to the heat sink provided by the brake support member 2. Another problem which may arise in the use of other attachment means is that differential thermal expansion between the carbon block and a metal component to which it is attached may cause break-up of the composite article; by the use of a relatively fine porous structure in accordance with the invention the effects of differential expansion are reduced.

In the case of a carbon fiber-reinforced brake member which may be very expensive, the method of attachment of carbon friction pads as described above has the advantage that it enables worn friction pads to be removed and replaced by new pads, without replacing the whole brake member as in the case of a carbon brake member having integral friction surfaces.

In a second embodiment of the invention, illustrated in FIG. 3, a friction element 30 is constructed as described above, except that the density of the porous metallic layer 31 is increased in the area 32 around the rivet holes 33 and along the radial abutment faces 36. In addition, the rear face 34 of the friction element may be raised in the area 32 around the rivet holes 33 to engage countersunk depressions 35 in the support member 2, for additional attachment strength. The local increase in density of the porous metallic layer may be achieved during the manufacture of a metal foam layer by the method described above, or by subsequent densification, or by local compression after manufacture.

In a third embodiment, illustrated in FIG. 4, a friction element 40 as described above incorporates a porous metallic layer 41 in which the density is relatively low in the region 42 furthest within the carbon material and is relatively high adjacent the rear face 43 of the friction element. The density may increase progressively through the thickness of the porous metallic layer, or the layer may be of stepped density.

In a fourth embodiment, illustrated in FIG. 5, a friction element 50 similar to that of the third embodiment described above is additionally provided with a sheet metal backing plate 51 permanently secured thereto by a suitable bonding means, for example by brazing. The backing plate 51 is dimpled at the rivet holes 52 and is located in these positions in countersunk conical depressions 53 in the support member 2. The friction element is further secured to the support member by rivets 7 extending through the conical depressions in the backing plates. By the use of this construction, the rivetted attachment is sufficiently strong in itself to transmit the frictional forces encountered in operation of the brake, and the radial abutment ribs on the support member may not be required.

Figure 7:
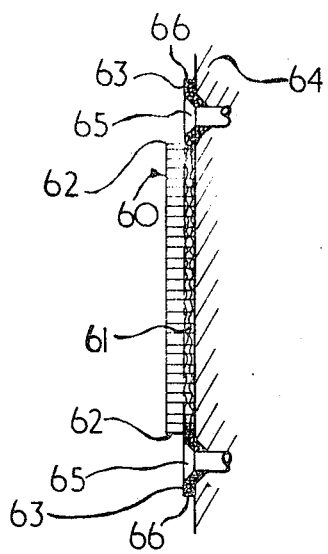
FIG. 7 is a sectional view on the line B—B of FIG. 6 of a friction element of the brake assembly.

In a fifth embodiment of the invention, illustrated in FIG. 6 and FIG. 7, a friction element 60 is constructed as described above in respect of the second embodiment, except that the porous metallic layer 61 is arranged to extend beyond the edges 62 of the carbon block. The extended portion 63 may be densified, for example by impregnation with brazing or other metal or by other means to strengthen the edge portions sufficiently to enable them to act as a backing plate for the friction block. The backing plate portions may then be attached to a supoprt member 64 by means of rivets 65 or by welding or brazing etc.

Although in the arrangement illustrated in FIGS. 6 and 7 the friction forces generated on the friction element 60 during operation of the brake are transmitted to the support member 64 solely by means of rivets 65, additional support means may be provided by means of radially extending ribs formed in the support member to abut radially extending edges 66 of the porous metallic layer 61.

Where, as in the fourth embodiment described above, the porous metallic layer is secured to a metal backing plate by the use of a brazing or soldering technique, the porous structure enhances the strength of the joint produced since it tends to take up the molten bonding material by capillary action. This effect would also be produced in the case of a porous layer secured to a backing plate by an adhesive, such as an epoxy resin adhesive.

In the embodiments described above, the invention is applied to the manufacture of aircraft brakes incorporating carbon friction pads, and is particularly effective in this application in view of the brittle nature of the carbon material and the difficulty experienced in bonding such material to other materials by conventional techniques. The invention is however also applicable to other bonding problems, for example to the bonding of glass to metal or layers of materials such as polytetrafluoroethylene to support members. The invention is also applicable, in a further example, to the manufacture of an electrical contactor in which a graphite block is secured to a rigid support by the means described and, more generally, to the manufacture of articles such as bearings, piston rings, slide bars for reciprocating parts, and rotary pump vanes, in which it may be necessary to provide an unlubricated low friction surface which is suitable for sliding contact with another surface.

Having now described our invention, what we claim is:

1. A composite article comprising a block of carbon having embedded therein a layer of foam metal having a three-dimensional network defining a plurality of intercommunicating cellular spaces, the said layer extending adjacent one surface of the block but not wholly therethrough.

2. A composite article according to claim 1 wherein part of the foam metal extending adjacent the said surface of the block of carbon is formed into a projection for engagement with a corresponding depression of an associated support member.

3. A composite article according to claim 2 wherein the projection is of a conical shape and is formed concentrically with a hole provided in the block for attachment of the block to a support member by means of a rivet.

4. A composite article according to claim 1 wherein the density of the foam metal varies progressively through the thickness of the layer of said material.

5. A composite article according to claim 1 wherein the layer of foam metal is of stepped density.

6. A composite article according to claim 1 wherein the layer of foam metal projects beyond at least one edge of the block.

7. A composite article according to claim 1 wherein a sheet metal backing plate is permanently secured to the layer of foam metal.

8. A composite article according to claim 1 wherein the said foam metal layer is embedded in carbon and the block also comprises a layer of graphite bonded to the carbon.

9. An assembly comprising a composite article according to claim 1 secured to a support member.

10. An assembly according to claim 9 wherein the composite article is secured to the support member with the layer of foam metal arranged adjacent the support member.

11. An assembly comprising a composite article according to claim 2 wherein a projection is secured in a corresponding depression of the support member.

12. An assembly comprising a composite article according to claim 6 wherein the projecting edge of the porous material is secured to a support member.

References Cited

UNITED STATES PATENTS

| | | | |
|---|---|---|---|
| 2,671,955 | 3/1954 | Grubel et al. | 75—20 F |
| 2,728,109 | 12/1955 | Bonnot. | |
| 2,763,059 | 9/1956 | Caton et al. | 29—195 C |
| 2,973,842 | 3/1961 | Smiley | 192—107 M |
| 2,984,604 | 5/1961 | Duva et al. | 29—195 C |
| 3,089,196 | 5/1963 | Knapp et al. | 29—195 C |
| 3,617,364 | 11/1971 | Jarema | 161—160 |

FOREIGN PATENTS

| | | | |
|---|---|---|---|
| 249,531 | 5/1963 | Australia | 29—195 C |

WILLIAM J. VAN BALEN, Primary Examiner

U.S. Cl. X.R.

75—20 F; 192—107 M; 161—159, 160, 166, 168